No. 856,083. PATENTED JUNE 4, 1907.
P. H. MURPHY.
PNEUMATIC DRILL.
APPLICATION FILED JUNE 16, 1905.
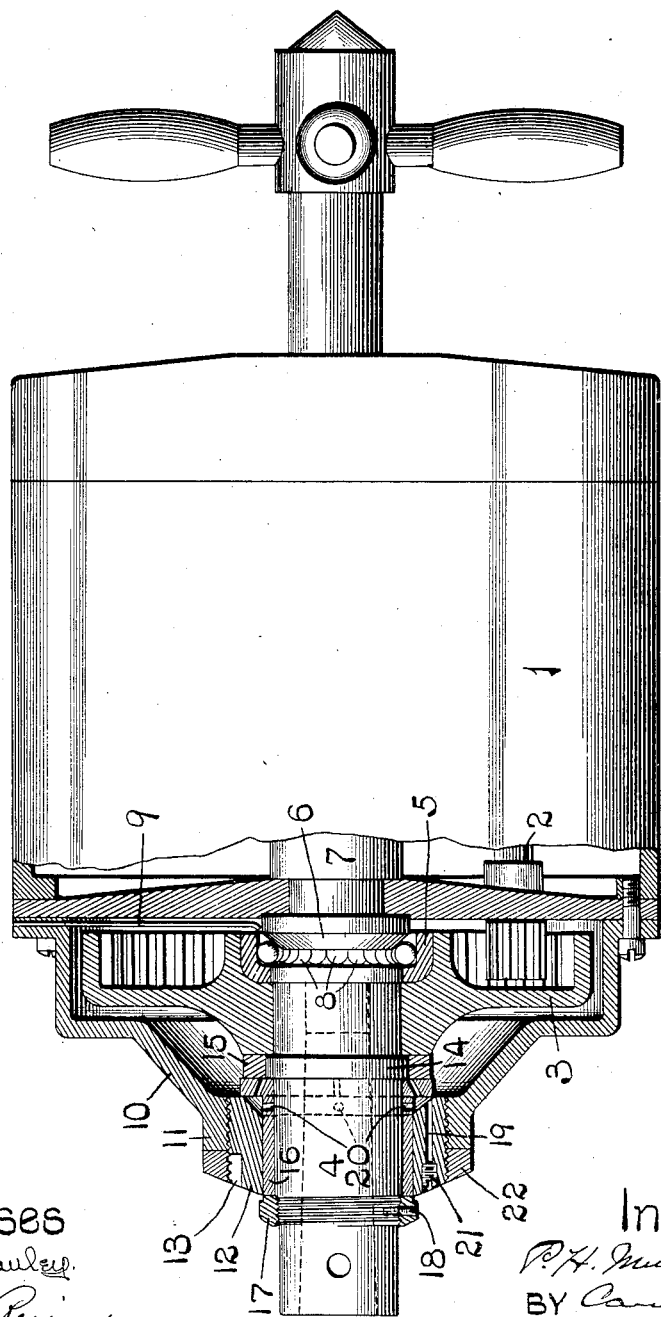
Witnesses
Inventor:
ATTY'S.

UNITED STATES PATENT OFFICE.

PETER H. MURPHY, OF ST. LOUIS, MISSOURI.

PNEUMATIC DRILL.

No. 856,083.     Specification of Letters Patent.     Patented June 4, 1907.

Application filed June 16, 1905. Serial No. 265,506.

*To all whom it may concern:*

Be it known that I, PETER H. MURPHY, a citizen of the United States, and a resident of the city of St. Louis and State of Missouri, have invented a new and useful Improvement in Pneumatic Drills, of which the following is a specification.

My invention relates to pneumatic drills and has for its principal objects to improve the bearing for the spindle and to provide for the proper oiling thereof.

It consists in the construction and in the arrangements and combinations of parts hereinafter described.

The accompanying drawing, which forms part of this specification, is a view of a pneumatic drill showing the parts at the forward end thereof in longitudinal section.

The main frame of my machine is a casing 1 having parallel hollow trunnions therein, upon which are journaled oscillating engines whose pistons are connected to crank arms on shafts arranged parallel to the trunnion. The hollow trunnions are connected up to a source of pressure and provided with release ports for the proper operation of the oscillating engines. As the actuating mechanism is well known in the art it is unnecessary to describe it in detail; it being sufficient for present purposes to state that pressure from the source of supply effects the actuation of the oscillating engines to bring about the rotation of the shafts.

The shafts have pinions 2 fixed thereon which mesh with an internally toothed gear wheel 3 mounted on the main spindle 4 of the drill. This main spindle is hollow; its interior being of polygonal shape adapted for the shank of a drill or other working tool to fit therein so as to turn with the spindle but be free to move longitudinally therein.

The rear bearing of the main spindle is a roller bearing comprising a cup 5 set into the hollow rear hub of the gear wheel 3 on the main spindle and arranged to coöperate with a bearing cone 6 mounted on the main thrust bar 7 so as to constitute therewith a ball race for antifriction balls 8. The bearing cone has a hollow threaded sleeve which works on the main thrust-bar and has a flanged portion overlapping the front wall of the casing. In order to provide for the proper oiling of the ball bearing, a tube 9 extends down in front of and alongside of the front wall of the casing from a port in the outer surface of the casing to the ball race.

Mounted on the front wall of the casing is a bracket or shell 10 which extends forwardly and constitutes a casing for the gear and pinions. This shell terminates in a hub 11, which is threaded interiorly to receive an exteriorly threaded sleeve 12 which has holes 13 formed in its outer end to coöperate with a tool for adjusting it. The inner rear edge of this sleeve is beveled off to provide for the oiling of the spindle bearing as hereinafter stated.

The main spindle is provided with an annular rib or shoulder 14 against whose rear wall the front hub of the main gear abuts and around which rib extends a spacing washer 15. The front bearing of the spindle consists of a sleeve 16 of considerable length made of brass or other suitable antifriction metal. The rear end of this sleeve has an outwardly projecting flange which overlaps the rear end of the threaded sleeve 12. The portion of the spindle forward of this bearing sleeve 16 is threaded to receive a nut 17 which is intended as a dust or dirt cap to prevent chips entering between the spindle and its bearing. This dirt cap is held in position by means of a set screw 18 extending through it and against the spindle.

In order to provide for the proper lubrication of the front bearing, a channel or passageway 19 extends through the adjusting sleeve 12 and terminates in the beveled rear portion thereof. The space between the beveled end of this adjusting sleeve 12 and the flanged end of the bearing sleeve 16 thus constitutes an oil chamber which may be filled through the passageway 19. Lubricating holes 20 extend from this oil chamber radially through the bearing sleeve, and at an angle through the flange thereof to a point opposite the shoulder on the main spindle. The oil channel in the adjusting sleeve is closed by a suitable screw plug 21; and the adjusting sleeve is held in position by a set nut or ring 22.

It is noted that the adjustment of the main spindle is effected entirely by the single adjusting sleeve 12.

What I claim as my invention and desire to secure by Letters Patent is;

1. A pneumatic drill comprising a main frame, a main spindle, a thrust bar in alinement with said spindle, and a bearing interposed between said spindle and said thrust bar, a threaded hub supported by said main frame, a threaded sleeve working in said hub, and a flanged bearing sleeve inside of said hub and having its flange interposed between the end of said adjusting sleeve and a shoulder on said spindle.

2. A pneumatic drill comprising a main frame, a spindle, a thrust bar in alinement with said spindle, a ball bearing interposed between said spindle and said thrust bar, a threaded hub supported by said main frame, a threaded sleeve working on said hub, and a flanged bearing sleeve inside of said hub and having its flange interposed between the end of said adjusting sleeve and a shoulder on said spindle, the adjusting sleeve having an oil hole extending therethrough and having its bore enlarged at its rear end to constitute with the flanged bearing sleeve an oil chamber, and the bearing sleeve having holes opening into said oil chamber.

3. A pneumatic drill comprising a main frame, a spindle, a thrust bar in alinement with said spindle, a ball bearing interposed between said spindle and said thrust bar, a threaded hub supported by said main frame, a threaded sleeve working in said hub, and a flanged bearing sleeve inside of said hub and having its flange interposed between the end of said adjusting sleeve and a shoulder on said spindle, the adjusting sleeve having an oil hole extending therethrough and having its inner rear edge beveled to constitute with the flanged bearing sleeve an oil chamber, and the bearing sleeve having holes opening into said oil chamber.

4. A pneumatic drill comprising a main frame, a main spindle, a thrust bar in alinement with said spindle, a ball bearing interposed between said spindle and said thrust bar, a shell mounted on the main frame and arranged to constitute a hub for said spindle, and an oil tube arranged inside of said shell and extending from a hole in the surface thereof to said ball bearing.

5. A pneumatic drill comprising a main frame, a main spindle, a thrust bar in alinement with said spindle, a rear bearing interposed between said spindle and said thrust bar, a threaded hub supported by said main frame, a threaded sleeve working in said hub and a flanged sleeve inside of said first mentioned sleeve and constituting the front bearing for said spindle, said bearing sleeve having its flange interposed between the end of said adjusting sleeve and the shoulder of said spindle.

St. Louis, Mo., June 10, 1905.

PETER H. MURPHY.

Witnesses:
J. B. MEGOWN,
FRED F. REISNER.